(12) United States Patent
Rule et al.

(10) Patent No.: US 11,671,828 B2
(45) Date of Patent: *Jun. 6, 2023

(54) MULTI-FACTOR AUTHENTICATION PROVIDING A CREDENTIAL VIA A CONTACTLESS CARD FOR SECURE MESSAGING

(71) Applicant: Capital One Services, LLC, McLean, VA (US)

(72) Inventors: Jeffrey Rule, Chevy Chase, MD (US); Kevin Osborn, Newton, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/993,052

(22) Filed: Nov. 23, 2022

(65) Prior Publication Data

US 2023/0079943 A1 Mar. 16, 2023

Related U.S. Application Data

(60) Continuation of application No. 17/869,432, filed on Jul. 20, 2022, now Pat. No. 11,540,127, which is a division of application No. 16/931,530, filed on Jul. 17, 2020, now Pat. No. 11,432,146, which is a continuation of application No. 16/727,162, filed on Dec. 26, 2019, now Pat. No. 10,757,574.

(51) Int. Cl.
*H04W 12/06* (2021.01)
*H04L 9/40* (2022.01)
*H04L 9/32* (2006.01)
*H04W 4/14* (2009.01)
*G06Q 20/32* (2012.01)

(52) U.S. Cl.
CPC ........ *H04W 12/06* (2013.01); *G06Q 20/3278* (2013.01); *H04L 9/3228* (2013.01); *H04L 63/0838* (2013.01); *H04W 4/14* (2013.01)

(58) Field of Classification Search
CPC .......................... G06Q 20/352; G06Q 20/354
USPC ........................ 235/375, 380; 455/41.1, 558
See application file for complete search history.

(56) References Cited

U.S. PATENT DOCUMENTS 11,502,837 B2 * 11/2022 Gaddam .......... G06Q 20/38215
2012/0036076 A1 * 2/2012 Vanderwall .......... H04L 9/0822
705/75

* cited by examiner

*Primary Examiner* — Kiet M Doan
(74) *Attorney, Agent, or Firm* — KDW Firm PLLC

(57) ABSTRACT

Exemplary embodiments may use a contactless card as a secondary form of authentication in a multi-factor authentication for a secure messaging service. The recipient party of a request to initiate a messaging service session (such as a server computing device) may be programmed to use the phone number of the originating device to look up records regarding an identity of a party and their associated phone number as a primary credential and then may require an authentication credential originating from the contactless card as a secondary credential for the initiating party. In some instances, the credential originating from the contactless card is a onetime password that is valid only for a period of time. The recipient party determines whether the onetime password is valid. If both credentials are valid, a secure messaging session may be initiated with the initiating party.

20 Claims, 13 Drawing Sheets

MULTI-FACTOR AUTHENTICATION PROVIDING A CREDENTIAL VIA A CONTACTLESS CARD FOR SECURE MESSAGING

CROSS-REFERENCE TO RELATED APPLICATIONS

This application claims priority to and is a continuation of U.S. patent application Ser. No. 17/869,432 filed on Jul. 20, 2022, which is a divisional of U.S. patent application Ser. No. 16/931,530 filed on Jul. 17, 2020 (issued as U.S. Pat. No. 11,432,146 on Aug. 30, 2022), which is a continuation of U.S. patent application Ser. No. 16/727,162 filed on Dec. 26, 2019 (issued as U.S. Pat. No. 10,757,574 on Aug. 25, 2020). The contents of the aforementioned U.S. patents and patent applications are incorporated herein by reference in their entireties.

BACKGROUND

Messaging services enable parties to communicate via written messages in a quick and convenient fashion. Messaging services have become increasingly used in business contexts. For example, customers may be able to have a messaging service session with a customer service representative of a company. One limitation of conventional messaging services is the lack of security. A party to a messaging service session may be able to spoof a phone number or assume a false identity in conventional messaging services sessions. As such, it is difficult to transmit potentially sensitive information, such as confidential information via conventional messaging services without fear of communicating with an imposter.

SUMMARY

In accordance with an exemplary embodiment, a computing device implemented method is performed. Per this method, a message is received at a computing device from a Short Message Service (SMS) capable device having an associated phone number. The message indicates a desire to initiate an SMS session, and the message includes a secure component. The secure component is decrypted to obtain a hash of at least a onetime password and an account identifier. The onetime password and the account identifier are extracted. A determination is made whether the onetime password is valid. The account associated with the account identifier is determined, and a phone number connected with the determined account is determined. A determination is made whether the associated phone number is a matching phone number that matches the phone number connected with the account. Where the password is valid and the associated phone number is a matching phone number, a secure SMS session is initiated by sending an SMS message to the SMS capable device. Where the password is not valid and/or the associated password is not a matching phone number, the initiation of the secure SMS session with the SMS capable device is rejected.

The decrypting may use a symmetric decryption algorithm. The method may include the additional steps of checking a geolocation of the SMS-capable device and using the geolocation as another authentication factor in determining whether or not to initiate the secure SMS session. The receiving the message may comprise receiving an SMS message. The onetime password may be a time-based password. The computing device may maintain a counter and may use a value of the counter in determining whether the password has expired. The counter maintained by the computing device may be in synch with a counter maintained by the contactless card.

In accordance with an exemplary embodiment, a Short Message Service (SMS) capable device-implemented method is performed. Per this method, a cryptographically secure onetime password is received from a contactless card at the SMS capable device via a near field communication. The cryptographically secure onetime password comprises an encrypted hash of at least the onetime password and an account identifier. The onetime password is encrypted by a symmetric encryption algorithm, and the onetime password is valid for only a set period of time. A message is sent from the SMS capable device to a party to request initiation of a secure SMS session, wherein the message includes the cryptographically secure onetime password and wherein the SMS capable device has an associated phone number. Where the password is valid and where the phone number of the SMS capable device is associated with an account identified by the account identifier, an SMS message is received from the party at the SMS capable device. Where the secure SMS session is initiated, a chatbot may be used to participate in the secure SMS session.

The sending of the message from the SMS capable device may comprise sending an initial SMS message. The sending of the message from the SMS capable device may comprise one of sending the message to a website for the party or sending the message directly to the party. The method may further include sending geolocation information from the SMS capable device to the party. The SMS message may be received from a chatbot.

In accordance with an exemplary embodiment, a method is performed by a contactless card. Per this method a near field communication (NFC) session is initiated with a computing device. As part of the NFC session, the contactless card communicates with an application program running on the computing device and at least a onetime password and an account identifier are passed through a hash function to create a hash value. The hash value is encrypted. The encrypted hash value is passed to the application running on the computing device. The application is prompted to send a message to a remote computing device to initiate a messaging session with the remote computing device where the message includes the encrypted hash value as evidence of an identity of a party that wishes to initiate the messaging session.

The onetime password may be a time-based password. The contactless card may maintain a counter, and a value of the counter may be used in creating the encrypted hash value. The value of the counter may be passed through the hash function. In some instances, the value of the counter may be passed through the hash function along with the onetime password and the account identifier. The onetime password may be valid only for a set period of time. The NFC session may be initiated responsive to tapping the contactless card on a card reader in the computing device.

DETAILED DESCRIPTION

Figure 1:
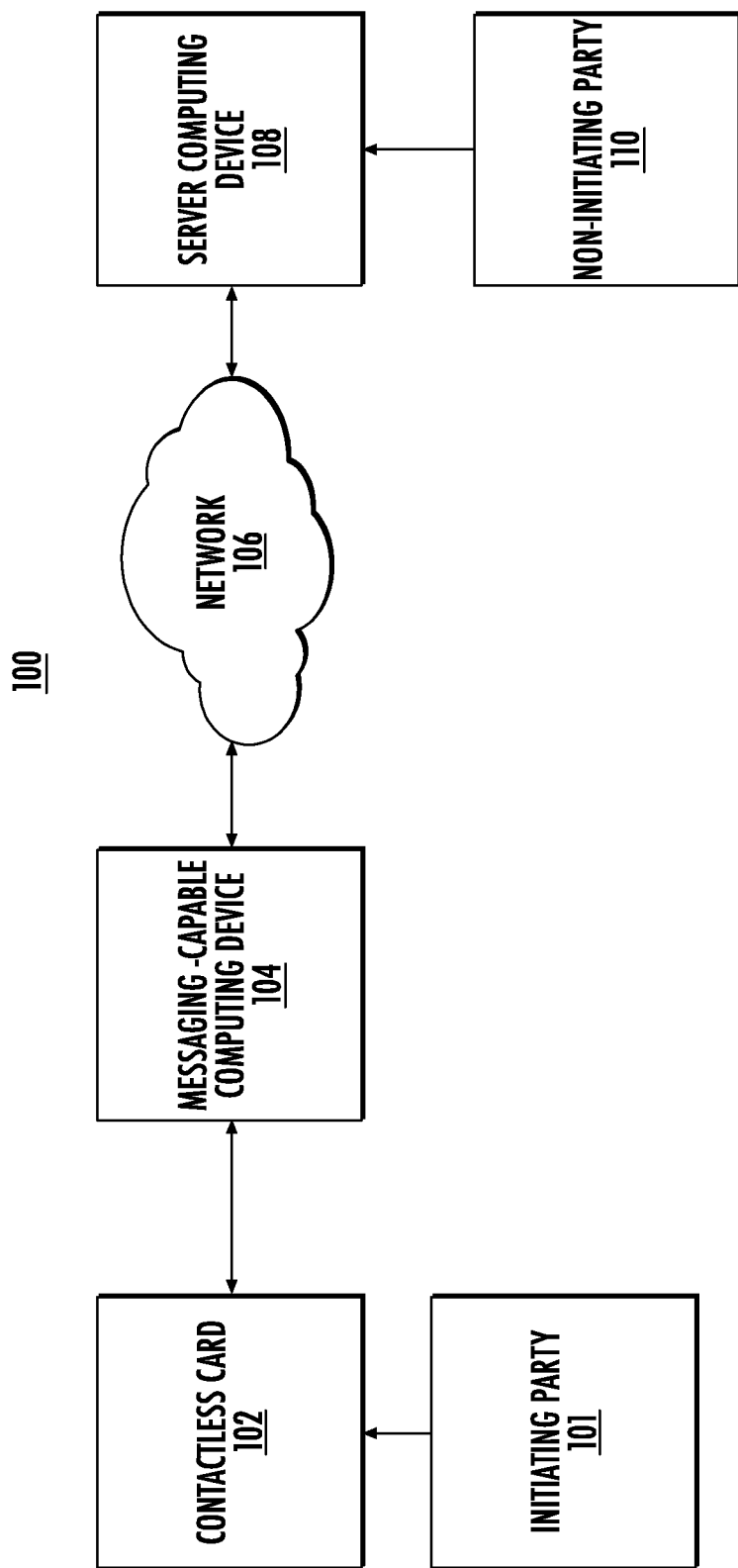
FIG. 1 depicts an environment suitable for practicing exemplary embodiments.

Exemplary embodiments may use a contactless card as a secondary form of authentication in a multi-factor authentication for a secure messaging service. Where messages for the secure messaging service originate from a device having an associated phone number, the phone number may serve as a primary credential of identity for authentication by the messaging service recipient party. The recipient party of a request to initiate a messaging service session (such as a server computing device) may be programmed to use the phone number of the originating device to look up records regarding an identity of a party and their associated phone number as a primary credential and then may require an authentication credential originating from the contactless card as a secondary credential for the initiating party. In some instances, the credential originating from the contactless card is a onetime password that is valid only for a period of time. The recipient party determines whether the onetime password is valid. If both credentials are valid, a secure messaging session may be initiated with the initiating party. The messaging service may take different forms. For example, the messaging service may be a short message service (SMS) service. The messaging service instead may be an instant messaging service, a social media messaging service, a video messaging service, a chat application or a virtual assistant application, etc.

Since the messaging service described herein may use multi-factor authentication of the initiating party for a messaging service session, the confidence of the non-initiating party involved in the messaging session that the communications are occurring with an authenticated party is enhanced. As such, the risk of an imposter participating in the messaging service session is greatly reduced. Hence, the secure messaging service disclosed herein is well-suited for exchange of potentially sensitive information, such as financial information, health information, business information, driving records, criminal records and other types of confidential information. The secure messaging service described herein is well suited for exchanges between customers and financial institution representatives, patients and healthcare providers, insured and insurance company representatives, clients and lawyers, clients and accountants and fellow corporate employees, etc. Encryption and secure hashing may be used to secure the content of messages that exchanged via the secure messaging service.

The onetime password may be encrypted as part of a secure package that is passed from the initiating party that initiates the secure messaging session to the recipient party. The secure package may hold identifying information, such as account information, for the initiating party. The onetime password may be hashed with a counter value before being added to the package and encrypted. The counter serves as a temporal indicator and helps to define the lifespan of the password.

As part of authentication, the recipient party decrypts the secure package. The recipient party may maintain its own counter value that is synched with the counter value maintained by the initiating party. If the counter value used by the initiating party in the secure package and the counter value maintained by the recipient do not match or differ too greatly in value, it may be an indication that the onetime password is no longer valid. The recipient party checks whether the onetime password is correct. In addition, the recipient party may use the account information to retrieve a phone number for the party associated with the account. The recipient party may check whether the retrieved phone number matches the phone number of the device from which the request originated. If the phone numbers match and the onetime password is correct and not expired, the recipient may initiate the messaging service by prompting a non-initiating party to send a message to the initiating party. The non-initiating party may be a person or a chatbot and may communicate either via the server or via separate client device. If the initiating party fails the authentication, either no message may be sent from the non-initiating party or a rejection message may be sent from the non-initiating party.

FIG. 1 depicts an environment 100 suitable for practicing an exemplary embodiment. The environment includes a contactless card 102 issued from an issuer to the initiating party 101. The initiating party 101 is in possession of the contactless card 102 and is advised to keep the contactless card 102 safe and in their possession given that the contactless card may produce a credential for authenticating identity of the initiating party. The contactless card 102 may be used in conjunction with a messaging-capable computing device 104. The messaging-capable computing device 104 supports one or more messaging services, such as those described above. The messaging-capable computing device 104 may be a smartphone, a desktop computer, a laptop computer, a tablet computer, a wearable computing device or any computing device that supports the messaging service and that is capable of enabling the initiating party 101 to participate in a secure messaging service as described herein.

As will be described below in more detail, the contactless card 102 may be used in authentication of the initiating party 101 by first interfacing with the messaging-capable computing device 104. The messaging-capable computing device 104 has a near field communication (NFC) reader that can read the contactless card 102 and conduct two-way communications with the contactless card 102. The messaging-capable computing device 104 is interfaced with a network 106. The network 106 may include a wired network and/or a wireless network. The network 106 may include local area networks (LANs) and/or wide area networks (WANs), including the Internet. A server computing device 108 is interfaced with the network 106. The server computing device 108 (e.g., the recipient party) receives the request to initiate a secure messaging system from the initiating party 101 by way of the messaging-capable computing device 104 through the messaging service and is responsible for performing the authentication. The non-initiating party 110 may be a party that has access to the server computing device 108 or may be a client of the server computing device that participates in a chat session using another computing device. The non-initiating party 110 may be a person, a chatbot or an intelligent agent.

Figure 2:
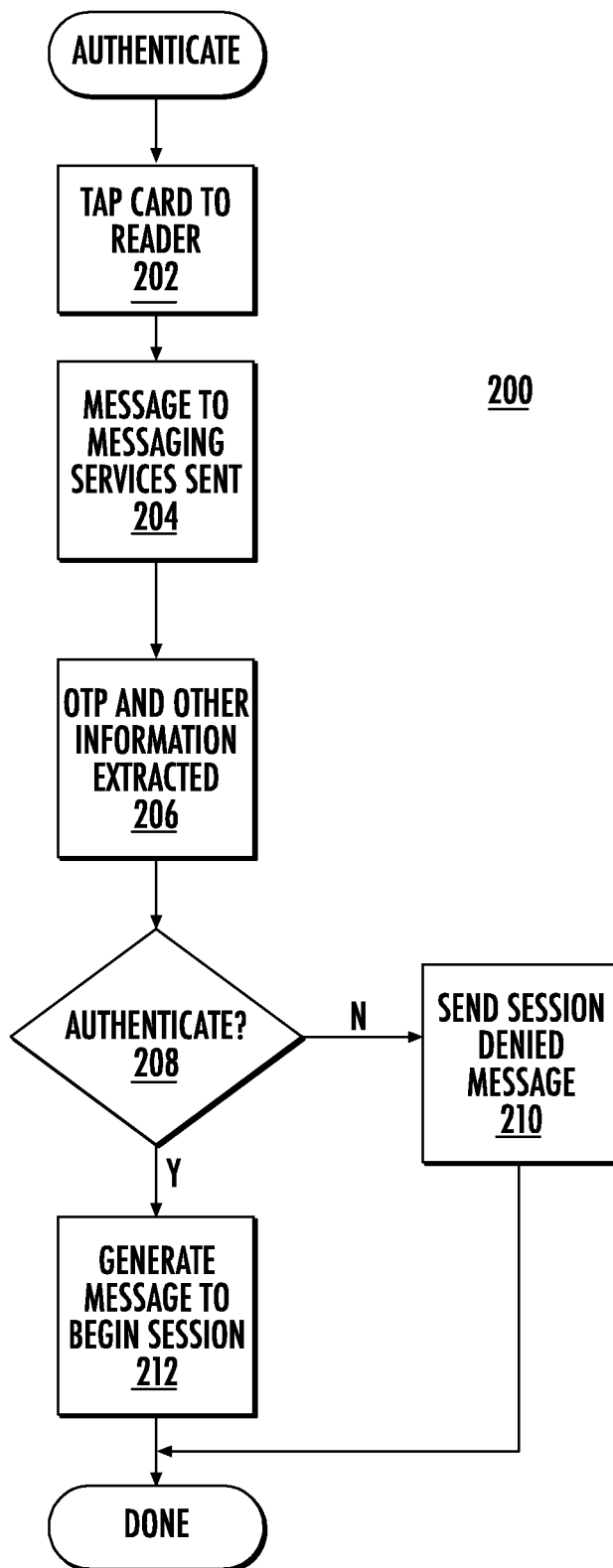
FIG. 2 depicts a flowchart illustrating steps that may be performed to authenticate an initiating party in an exemplary embodiment.
Figure 3:
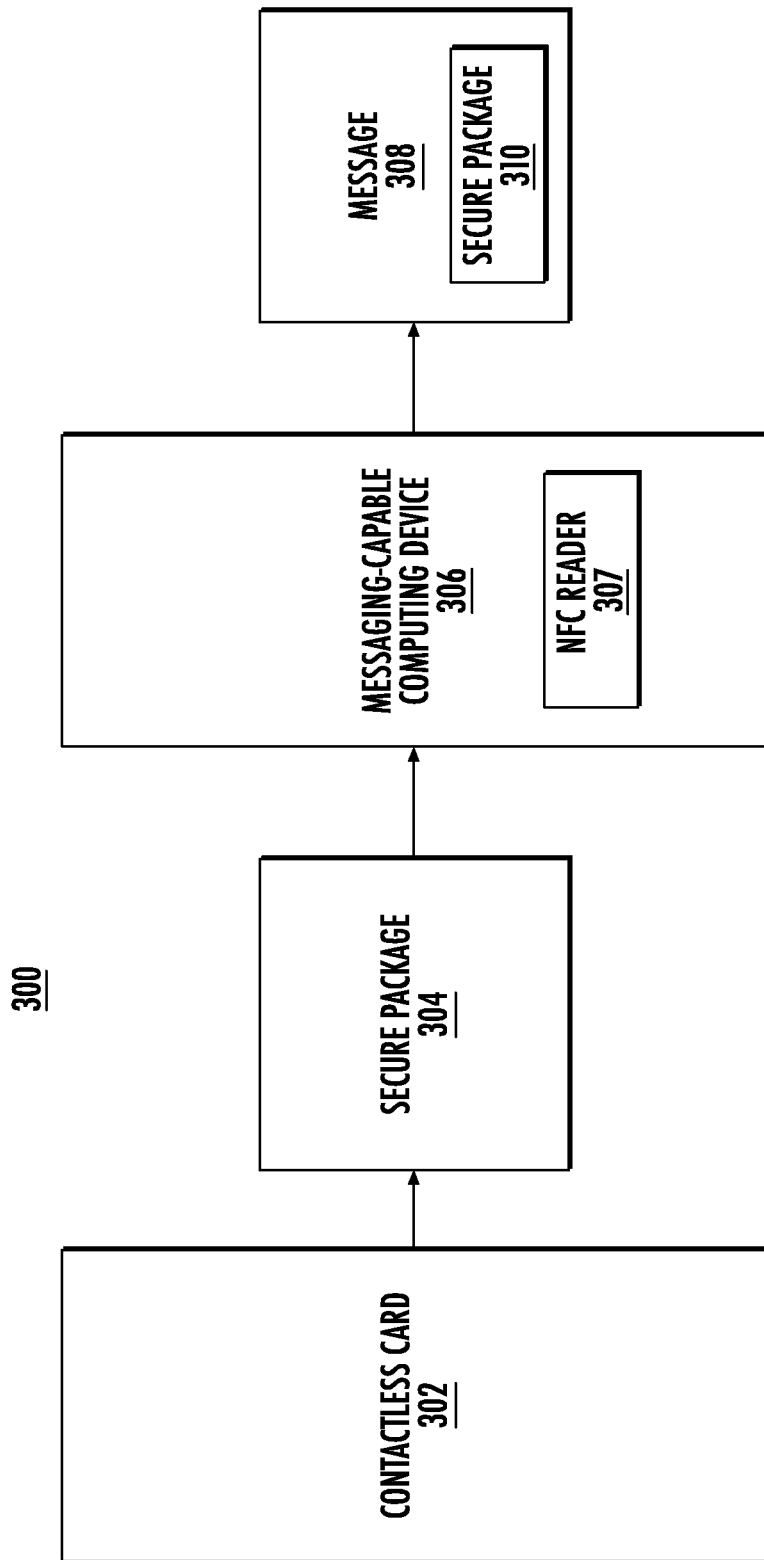
FIG. 3 depicts a block diagram showing the interaction between a contactless card and a messaging-capable device in an exemplary embodiment.
Figure 4:
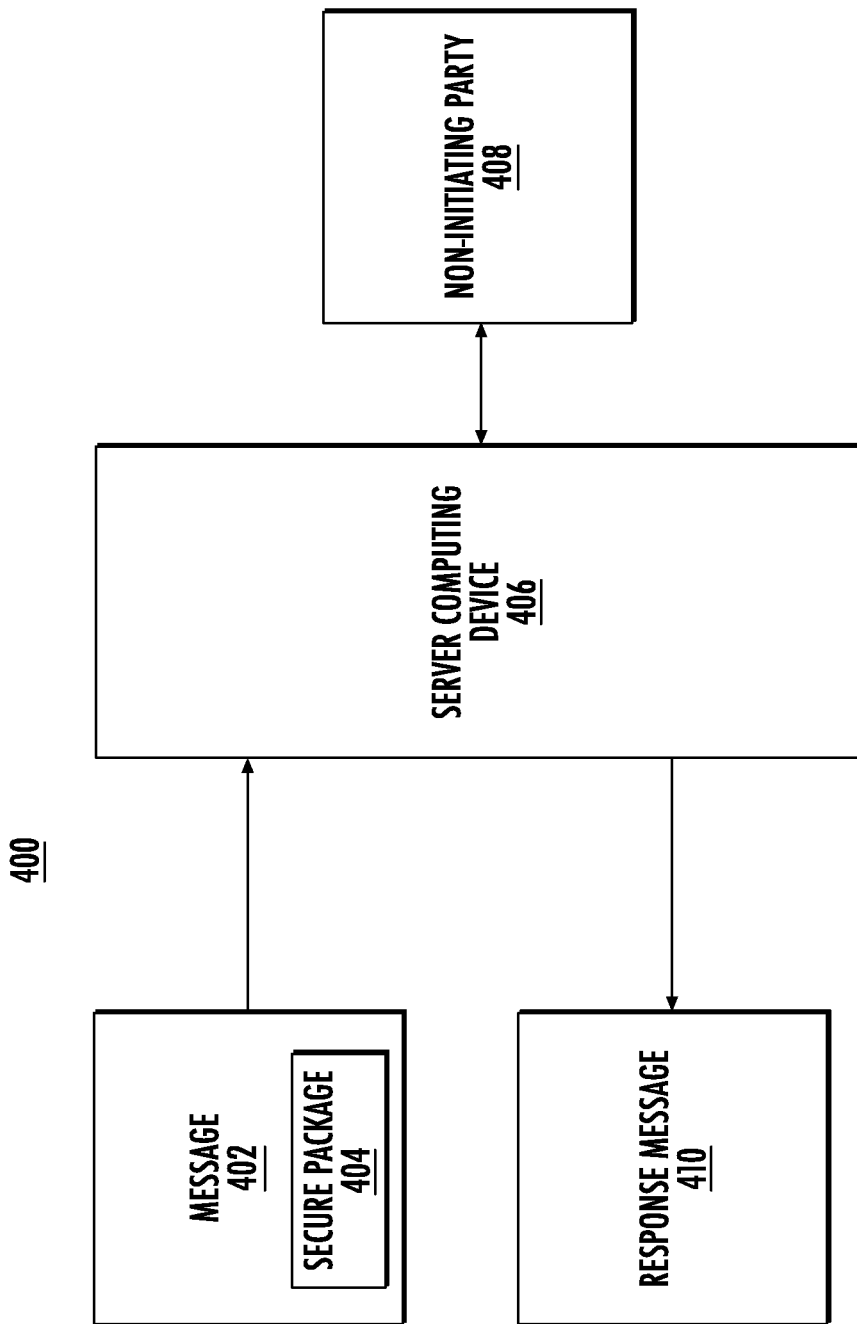
FIG. 4 depicts the flow of messages relative to a server computing device.

FIG. 2 shows a flowchart of the steps that may be performed in an exemplary embodiment to authenticate an initiating party that wishes to initiate a secure messaging service session with a non-initiating party. The steps are described below relative FIGS. 3 and 4. The process may begin with a party tapping a contactless card 302 (see FIG. 3) to a reader 307 in the messaging-capable computing device 306 (202). In some embodiments, the contactless card 302 and the reader 307 communicate via a near field communication (NFC) protocol. The tapping initiates an NFC communication between the contactless card and the reader 307 in the messaging-capable computing device 306. In other instances, the contactless card 302 need not tap the reader 307 but rather may need only be in sufficient proximity to the reader 307 to initiate an NFC communication session. In the NFC communication session, a secure package 304 is sent from the contactless card 302 to the messaging-capable computing device 306 that includes the secure package. The contactless card 302 may via communications prompt an application to be run on the messaging-capable computing device 306 to generate a message to the recipient party. In a direct method, the application is a chat program, such as an SMS messaging application or an application for one of the other varieties of messaging services. As will be described below, the messaging-capable computing device 306 generates an authentication message to attempt to initiate the secure messaging session. In the indirect method, the contactless card 302 provides a uniform resource locator (URL) for a server that includes the phone number for the server that is contacted from the messaging-capable computing device 306 to attempt to initiate the secure messaging service. The messaging-capable computing device 306 generates a message 308 encapsulating the secure package 310 that serves as a request to initiate a secure messaging system that is sent to the server computing device 406 (see FIG. 4) (204).

The request may be sent to the server computing device 406 via the messaging service or via another channel. As was mentioned above, the secure package 310 may include a onetime password and identifying information for the initiating party. The contents will be discussed in more detailed below. The server computing device 406 receives the message 402 and extracts the onetime password and other information (such as identifying information and counter value) from the secure package 404 (206). Based on the extracted information, the server computing device 406 either successfully authenticates the initiating party or does not successfully authenticate the initiating party (208). Where the initiating party is successfully authenticated, a response message 410 from the non-initiating party 408 is sent via the messaging service to the initiating party (212). The response message 410 may inform the initiating party that they have been authenticated or may, for example, simply greet the initiating party and may ask the initiating party what they are contacting the non-initiating party 408 about. Conversely, if the initiating party is not successfully authenticated, a response message 410 denying the request for a secure messaging system is sent to the initiating party (210). In some alternative exemplary embodiments, no message is ever sent back to the initiating party in this case.

Figure 5A:
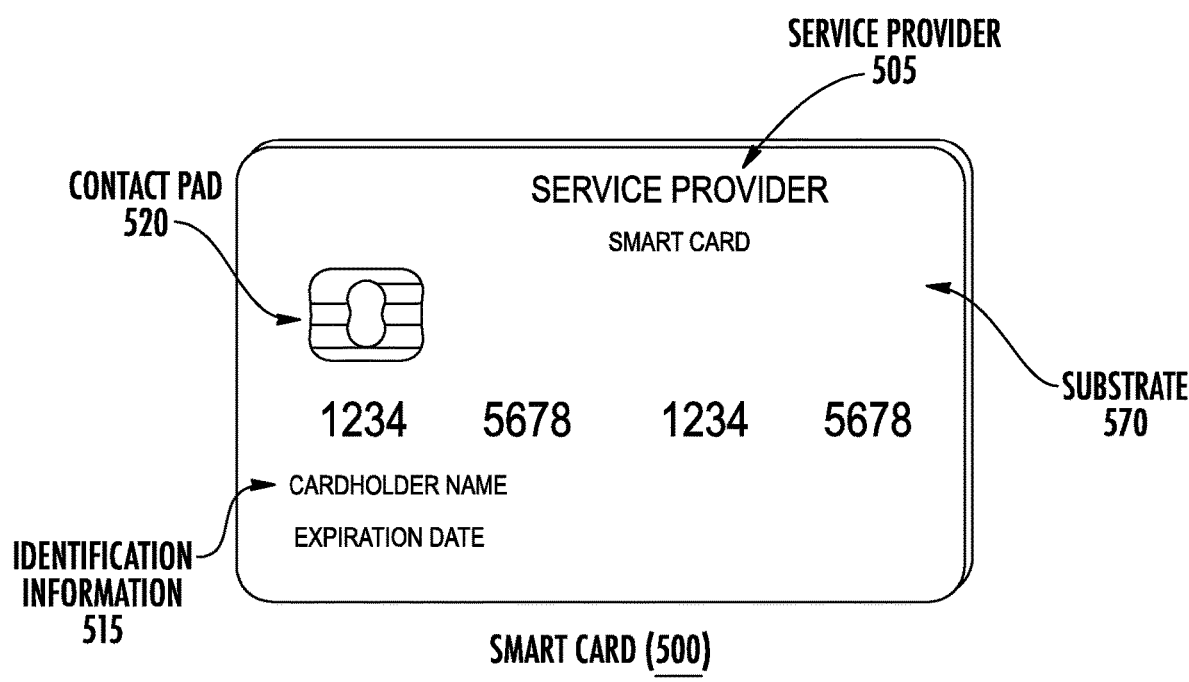
FIG. 5A depicts an illustrative front face of a contactless card.

FIG. 5A illustrates a contactless card 500, which may be a payment card, such as a credit card, a debit card, or a gift card, issued by a service provider 505 displayed on the front or back of the card 500. In some exemplary embodiments, the contactless card 500 is not related to a payment card, and may comprise, without limitation, an identification card. In some instances, the payment card may comprise a dual interface contactless payment card. The contactless card 500 may comprise a substrate 510, which may include a single layer or laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 500 may have physical characteristics compliant with the ID-1 format of the ISO/IEC 7810 standard, and the contactless card 500 may otherwise be compliant with the ISO/IEC 14443 standard. However, it is understood that the contactless card 500 according to the present disclosure may have different characteristics, and the present disclosure does not require a contactless card to be implemented in a payment card.

The contactless card 500 may also include identification information 515 displayed on the front and/or back of the card, and a contact pad 520. The contact pad 520 may be configured to establish contact with another communication device, such as a user device, smart phone, laptop, desktop, or tablet computer. The contactless card 500 may also include processing circuitry, antenna and other components not shown in FIG. 5A. These components may be located behind the contact pad 520 or elsewhere on the substrate 510. The contactless card 500 may also include a magnetic strip or tape, which may be located on the back of the card (not shown in FIG. 5A).

Figure 5B:
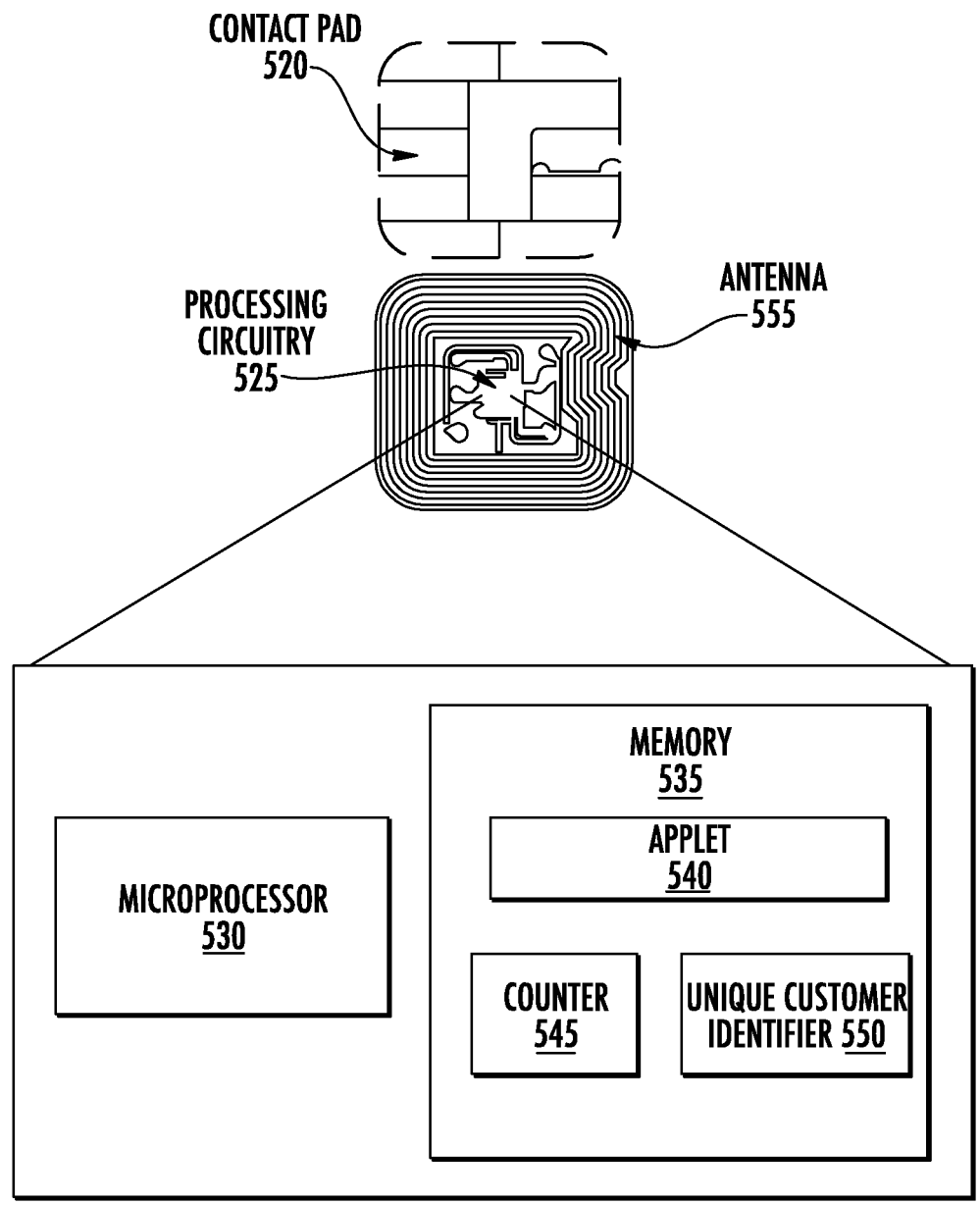
FIG. 5B depicts hardware components of a contactless card.

As illustrated in FIG. 5B, the contact pad 520 of FIG. 5A may include processing circuitry 525 for storing and processing information, including a microprocessor 530 and a memory 535. It is understood that the processing circuitry 525 may contain additional components, including processors, memories, error and parity/CRC checkers, data encoders, anti-collision algorithms, controllers, command decoders, security primitives and tamper proofing hardware, as necessary to perform the functions described herein.

The memory 535 may be a read-only memory, write-once read-multiple memory or read/write memory, e.g., RAM, ROM, and EEPROM, and the contactless card 500 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 535 may be configured to store one or more applets 540, one or more counters 545, and a customer identifier 550. The one or more applets 540 may comprise one or more software applications configured to execute on one or more contactless cards, such as Java Card applet. However, it is understood that applets 540 are not limited to Java Card applets, and instead may be any software application operable on contactless cards or other devices having limited memory. The one or more counters 545 may comprise a numeric counter sufficient to store an integer. The customer identifier 550 may comprise a unique alphanumeric identifier assigned to a user of the contactless card 500, and the identifier may distinguish the user of the contactless card from other contactless card users. In some examples, the customer identifier 550 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 520 or entirely separate from it, or as further elements in addition to processor 530 and memory 535 elements located within the contact pad 520.

In some examples, the contactless card 500 may comprise one or more antennas 555. The one or more antennas 555 may be placed within the contactless card 500 and around the processing circuitry 525 of the contact pad 520. For example, the one or more antennas 555 may be integral with the processing circuitry 525 and the one or more antennas 555 may be used with an external booster coil. As another example, the one or more antennas 555 may be external to the contact pad 520 and the processing circuitry 525.

In an embodiment, the coil of contactless card 500 may act as the secondary of an air core transformer. The terminal may communicate with the contactless card 500 by cutting power or amplitude modulation. The contactless card 500 may infer the data transmitted from the terminal using the gaps in the contactless card's power connection, which may be functionally maintained through one or more capacitors. The contactless card 500 may communicate back by switching a load on the contactless card's coil or load modulation. Load modulation may be detected in the terminal's coil through interference.

As explained above, the contactless card 500 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that comprises a cryptographically secure OTP encoded as an NDEF text tag.

Figure 5C:
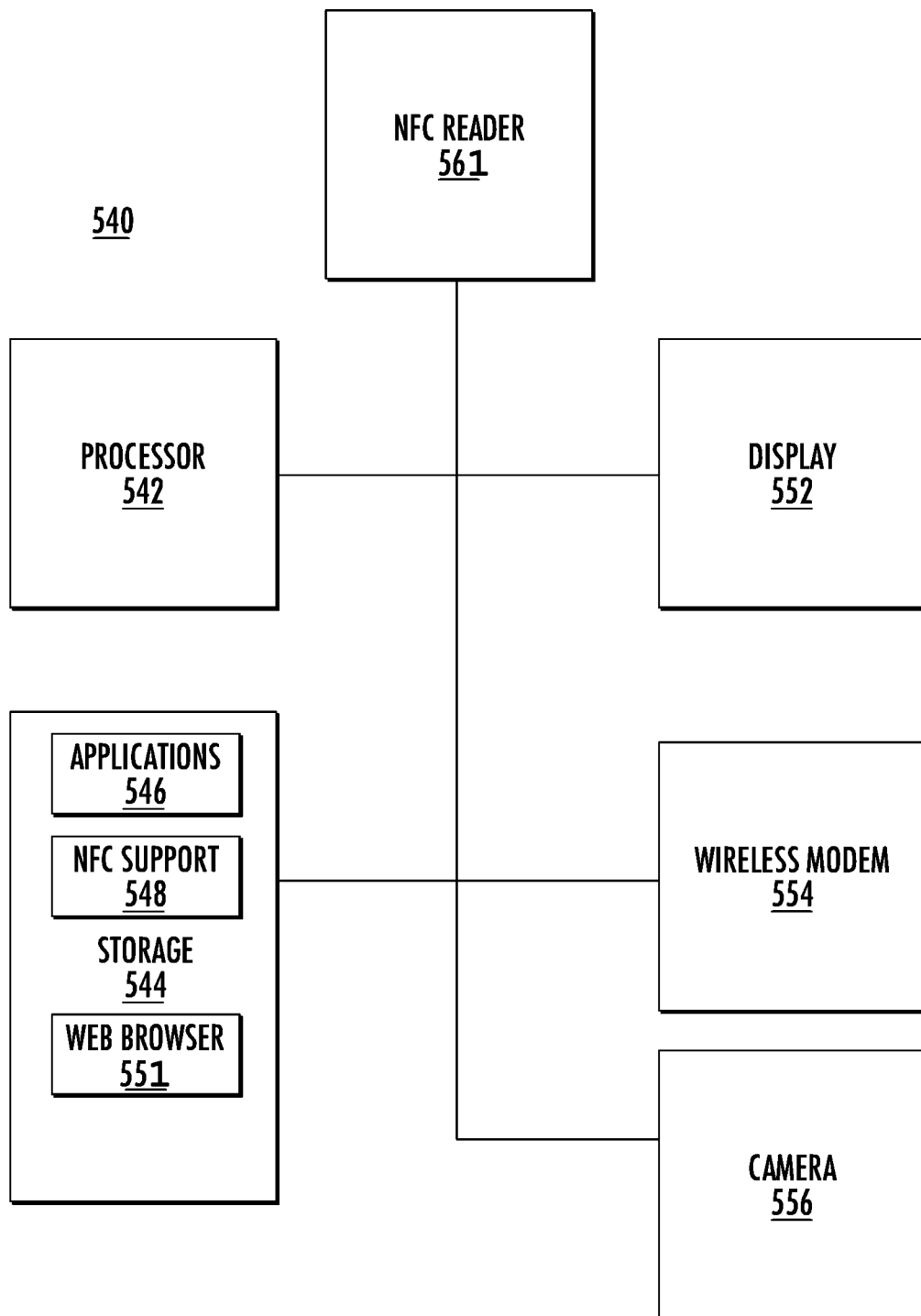
FIG. 5C depicts a block diagram of messaging-capable computing device.

FIG. 5C depicts a block diagram showing illustrative components of messaging-capable computing device 540. The messaging-capable computing device 540 may include a processor 542. The processor 542 may be a microprocessor, such as a central processing unit (CPU), a graphics processing unit (GPU), etc. The processor 542 may be realized as a field programmable gate array (FPGA), an application specific integrated circuit (ASIC), a controller, electric circuitry or the like that provides the functionality described herein for the processor of the messaging-capable computing device 540. The messaging-capable computing device 540 may include a storage 544. The storage 544 may include volatile memory and/or non-volatile memory. The storage 544 may include optical and/or magnetic storage devices and may include non-transitory computer-readable storage media storing instructions for execution by the processor 542. The storage 544 may include magnetic disk drives, optical disk drives, solid state storage, read only memory, random access memory, flash memory and the like. In the depiction of FIG. 5C, the storage 544 stores application programs 546, such as messaging applications or applications for providing functionality described herein. The storage 544 may also store computer-executable instructions that provide proximity protocol support 208 for NFC communications. In addition, the storage 544 may store a web browser 551 for facilitating web access. It will be appreciated that the storage 204 may store other programs and data that are not depicted.

The messaging-capable computing device 540 may include an NFC reader 561, for participating in NFC communications. The messaging-capable computing device 540 may additionally include a display device 552, such as a light emitting diode (LED) display, a liquid crystal display (LCD) or a retinal display. The messaging-capable computing device 540 may include a wireless modem 554 for enabling communication over a wireless network, such as a cellular phone network. The messaging-capable computing device 540 may include a camera 556 for capturing images and/or video. The camera 556 may also be used in scanning optical codes.

Figure 5D:
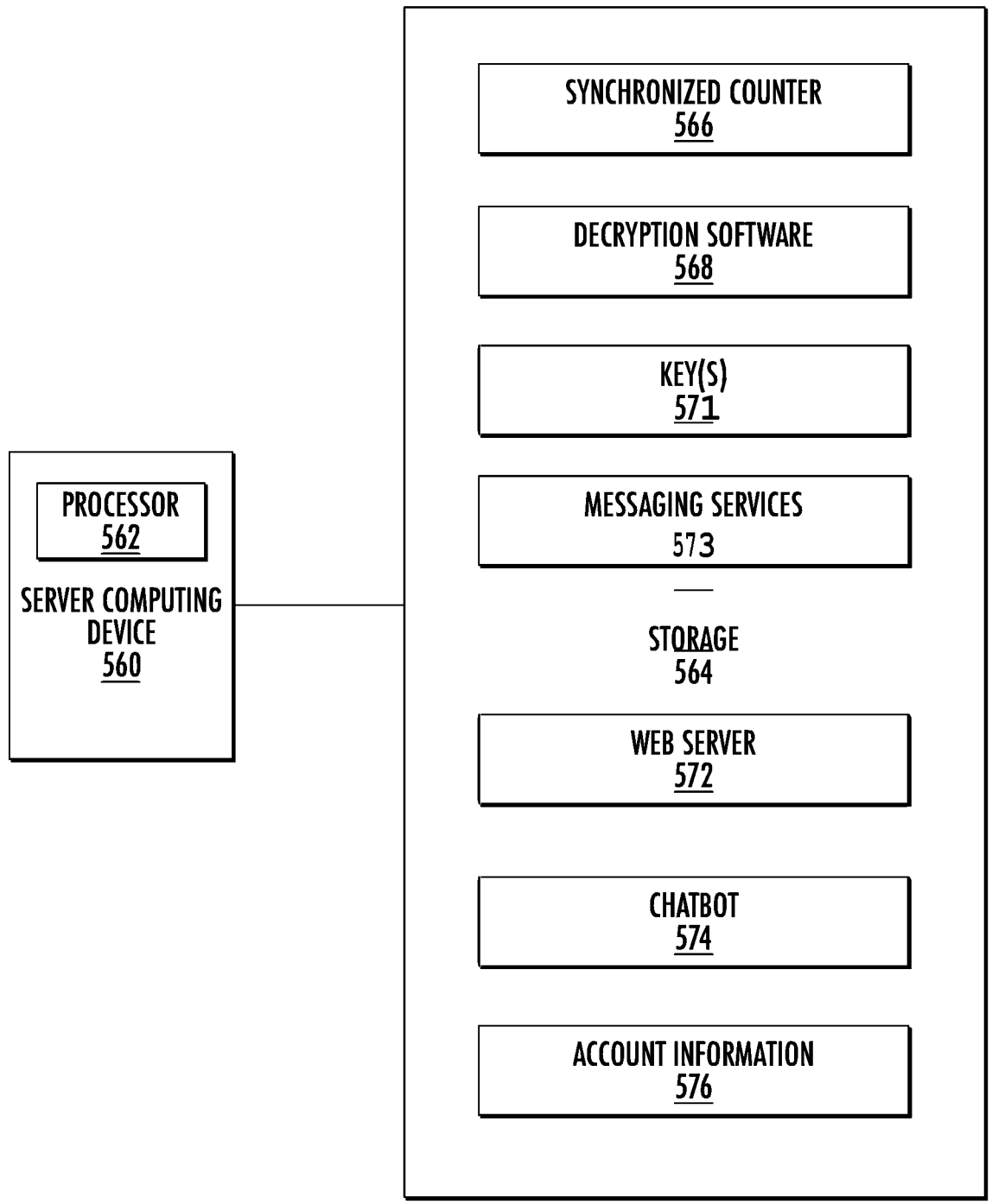
FIG. 5D depicts a block diagram of a server computing device and storage.

FIG. 5D depicts a block diagram of a server computing device 560. The server computing device 560 may take many forms, including but not limited to a desktop computer, a workstation or a server. The server computing device 560 may include a processor 562. The processor 562 may take any of multiple forms like those discussed relative to the messaging-capable computing device of FIG. 5C. The server computing device 560 may include or have access to a storage 564. The storage 564 may include the various forms of storage that were discussed relative to the messaging-capable computing device of FIG. 5C. The storage 564 may hold programs, applets, and/or executable code that may be executed by the processor 562. For example, the storage may store a synchronized counter 566 as is discussed below. The storage 564 may also store decryption software 568 for decrypting the secure package and the hashed content and encryption/decryption keys 571. The storage 564 may store messaging services software 573 for the secure messaging service. The storage 564 may store software for a web server 572 and a chatbot 574. The storage 564 may store account information 576 for clients or customers. This account information 576 may be stored in databases in some exemplary embodiments.

Generally, the server computing device 560 (or another computing device) and the contactless card 500 may be provisioned with the same master key (also referred to as a master symmetric key). More specifically, each contactless card 500 is programmed with a distinct master key that has a corresponding pair in the server computing device 560. For example, when a contactless card 500 is manufactured, a unique master key may be programmed into the memory 535 of the contactless card 500. Similarly, the unique master key may be stored in a record of a customer associated with the contactless card 500 in the account information 576 of the server computing device 560 (and/or stored in a different secure location). The master key may be kept secret from all parties other than the contactless card 500 and server computing device 560, thereby enhancing security of the system.

The master keys may be used in conjunction with the counters 104 to enhance security using key diversification. The counters 545 and 566 comprise values that are synchronized between the contactless card 500 and server computing device 560. The counter value may comprise a number that changes each time data is exchanged between the contactless card 500 and the server computing device 560 (and/or the contactless card 500 and the messaging-capable computing device 540). To enable NFC data transfer between the contactless card 500 and the messaging-capable computing device 540, an application 546 may communicate with the contactless card 500 when the contactless card 500 is sufficiently close to NFC reader 561 of the messaging-capable computing device 540. NFC reader 561 may be configured to read from and/or communicate with contactless card 500.

For example, a user may tap the contactless card 500 to the messaging-capable computing device 540, thereby bringing the contactless card 500 sufficiently close to the NFC reader 561 of the messaging-capable computing device 540 to enable NFC data transfer between the messaging-capable computing device 540 may trigger the NFC reader 561 via an API call. In addition and/or alternatively, the messaging-capable computing device 540 may trigger the NFC reader 561 based on periodically polling the NFC reader 561. More generally, the messaging-capable computing device 540 may trigger the NFC reader 561 to engage in communications using any feasible method. After communication has been established between messaging-capable computing device 540 and the contactless card 500, the contactless card 500 may generate a message authentication code (MAC) cryptogram. In some examples, this may occur when the contactless card 500 is read by the application 546. In particular, this may occur upon a read, such as an NFC read, of a near field data exchange (NDEF) tag, which may be created in accordance with the NFC Data Exchange Format. For example, a reader, such as the application 546 and/or the NFC reader 561, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, the counter value maintained by the contactless card 500 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message). In some examples, the MAC cryptogram may be transmitted as an NDEF tag, and in other examples the MAC cryptogram may be included with a uniform resource indicator (e.g., as a formatted string). The contactless card 500 may then transmit the MAC cryptogram to the messaging-capable computing device 540, which may then forward the MAC cryptogram to the server computing device 560 for verification as explained below. However, in some embodiments, the messaging-capable computing device 540 may verify the MAC cryptogram.

More generally, when preparing to send data (e.g., to the server 560 and/or the messaging-capable computing device 540), the contactless card 540 may increment the counter 545. The contactless card 500 may then provide the master key and counter value as input to a cryptographic algorithm, which produces a diversified key as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. The contactless card 500 may then encrypt the data (e.g., the customer identifier 107 and any other data) using the diversified key. The contactless card 500 may then transmit the encrypted data to the application 546 of the messaging-capable computing device 546 (e.g., via an NFC connection, Bluetooth connection, etc.). The application 546 of the messaging-capable computing device 540 may then transmit the encrypted data to the server computing device 560 via the network 106. In at least one embodiment, the contactless card 500 transmits the counter value with the encrypted data. In such embodiments, the contactless card 500 may transmit an encrypted counter value, or an unencrypted counter value.

Although the counter is used as an example, other data may be used to secure communications between the contactless card 500, the messaging-capable computing device 540, and/or the server computing device 560. For example, the counter may be replaced with a random nonce, generated each time a new diversified key is needed, the full value of a counter value sent from the contactless card 500 and the server computing device 560, a portion of a counter value sent from the contactless card 500 and the server computing device 560, a counter independently maintained by the contactless card 500 and the server computing device 560 but not sent between the two, a one-time-passcode exchanged between the contactless card 500 and the server computing device 560, and a cryptographic hash of data. In some examples, one or more portions of the diversified key may be used by the parties to create multiple diversified keys.

Figure 6A:
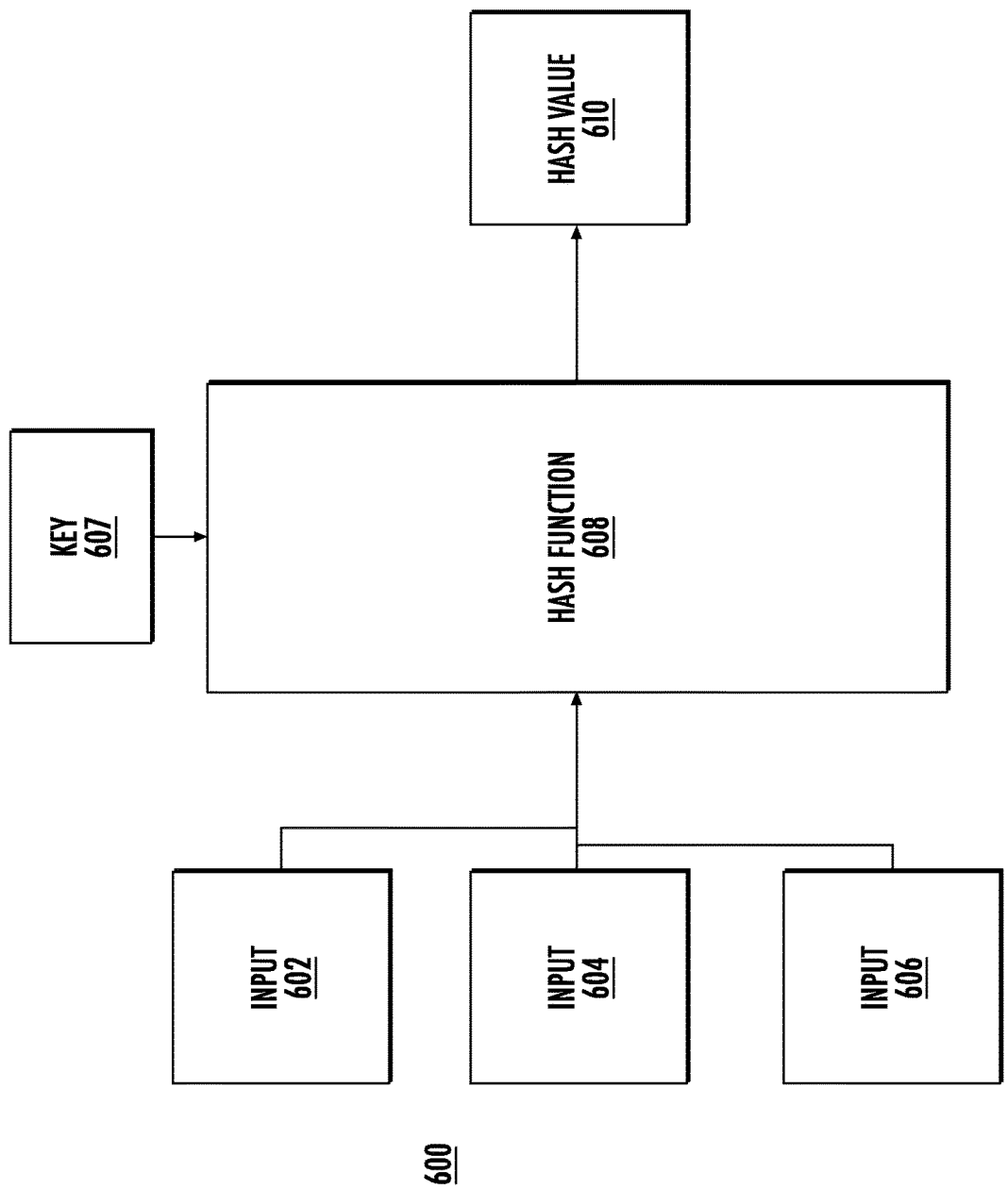
FIG. 6A depicts a diagram illustrating the hashing of inputs to produce a hash value.

The generation of the secure package 404 (FIG. 4) may employ cryptographic hash functions, such as MD5 or SHA-1. FIG. 6A shows a block diagram 600 depicting how the cryptographic hash functions may be used in exemplary embodiments. In the example shown in FIG. 6A, three inputs 602, 604 and 606 are passed through a hash function 608 together. The choice of depicting three inputs is intended to be illustrative and not limiting. Other number of inputs may be used in some instances. The hash function 608 produces an output hash value 610. Due to the nature of the hash function 608, it is computationally difficult to derive the inputs 602, 604 and 606 from the hash value 610 without knowing the key 607 used by the hash function 608. The key 609 is kept secret. The key 607 may be dynamically generated for each session and may be particular to the contactless card. Thus, the hash function 608 provides a layer of security for the content (e.g., inputs 602, 604 and 606) that is included in the secure package 404.

Figure 6B:
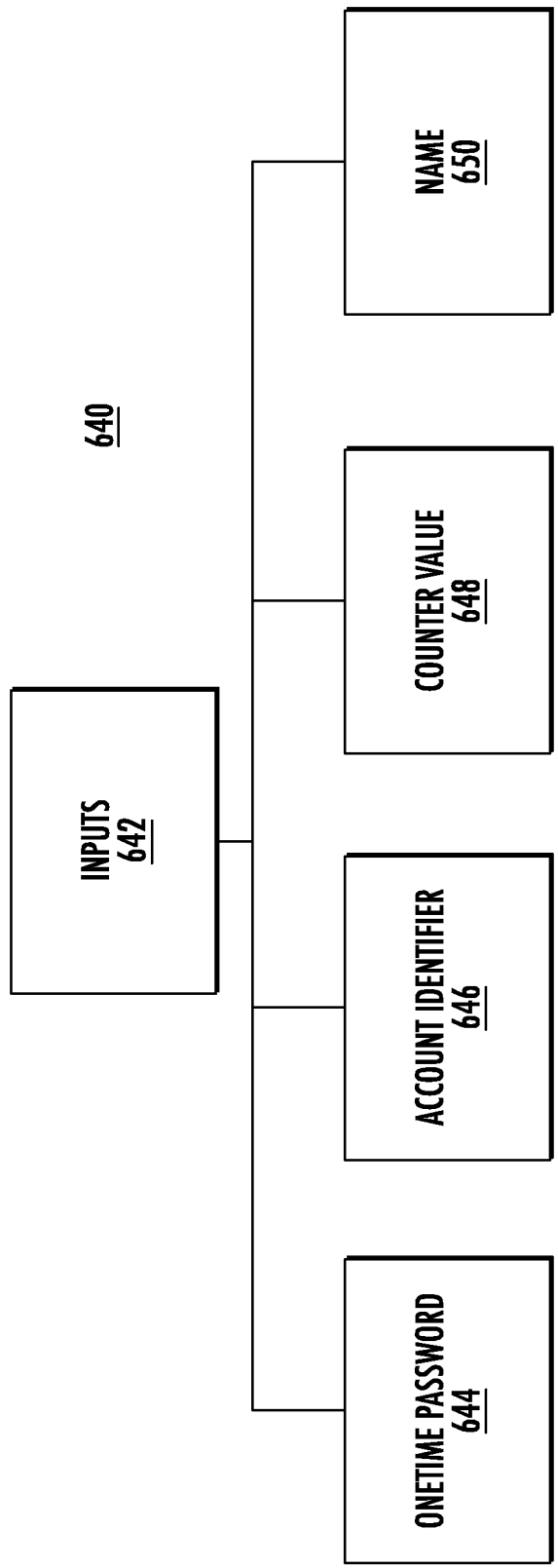
FIG. 6B depicts different types of inputs to the hash function.

In the exemplary embodiments, the inputs 602, 604 and 606 may vary depending on the information the parties wish to exchange and the protocol for authenticating the initiating party. FIG. 6B, shows a diagram 640 of possible types of inputs 642 that may be hashed in exemplary embodiments. In these exemplary embodiments, a onetime password 644 generated by the contactless card may be included as an input. An account identifier 646 for the initiating party may be provided. This may be an account number or other identifier that uniquely identifies the account of the initiating party. As was described above, the account identifier may be a phone number for the initiating party. In some cases, the phone number of the initiating party may not be included in the hash value 610 but may be derived from the message sent from the messaging-capable computing device 540. The inputs 642 may include a name 650 of the initiating party.

Figure 7:
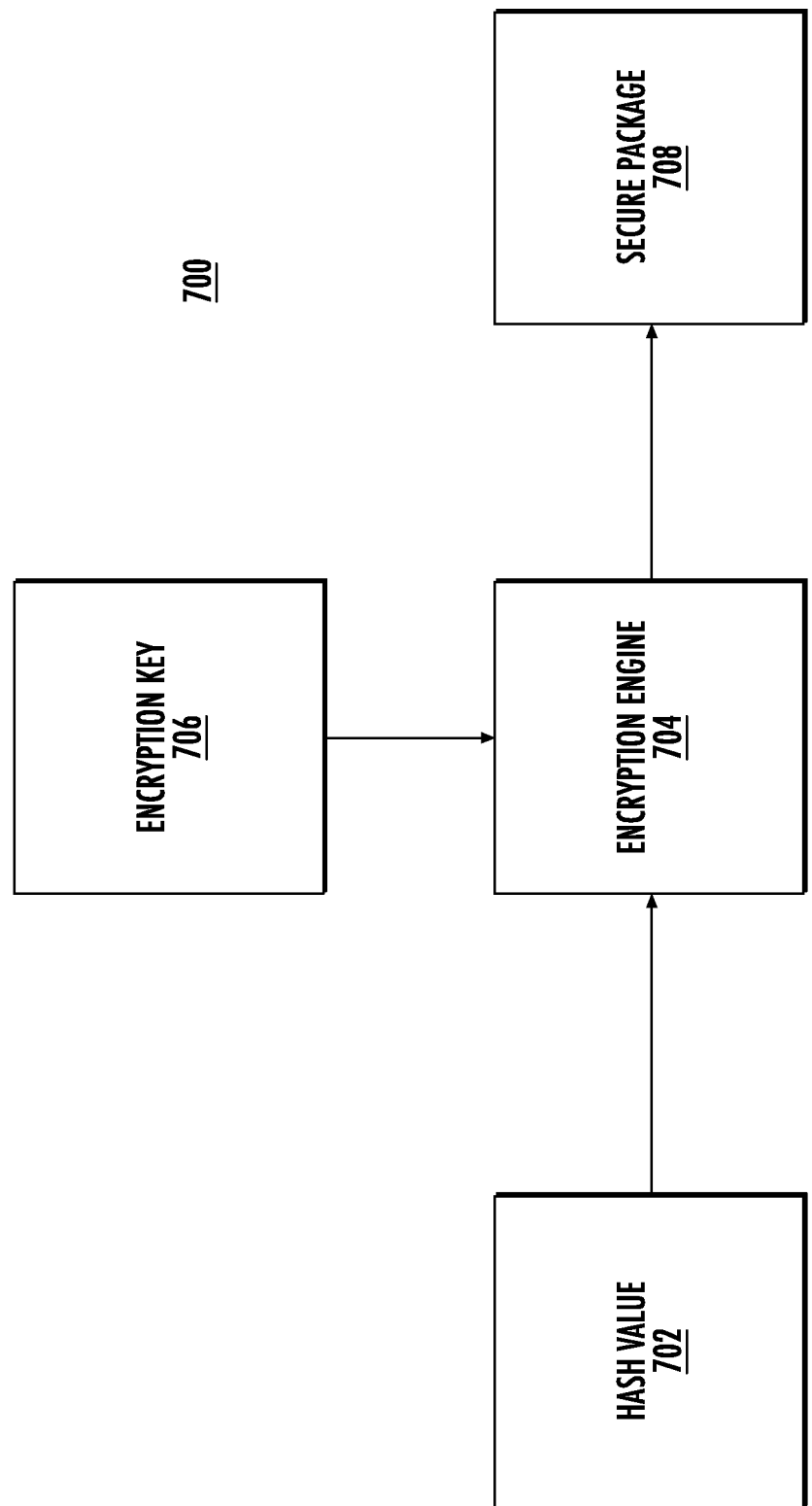
FIG. 7 depicts an encryption operation to produce a secure package.

As an added layer of security, the hash value 610 may be encrypted. FIG. 7 shows a block diagram 700 depicting such encryption. The hash value 702 generated as discussed above is passed to an encryption engine 704 that encrypts the hash value using an encryption key 706. The resulting output is the secure package 708. The encryption engine 704 may use any of a number of cryptographic algorithms, such as DES, AES, RSA, DSA or the like. These may be symmetric cryptographic algorithms like DES and AES or asymmetric cryptographic algorithms like RSA and DSA. It is presumed that the server computing device 406 (FIG. 4) possesses the appropriate key to decrypt the secure package. Although not shown in FIG. 7, other content may be encrypted in conjunction with the hash value 702.

Figure 8:
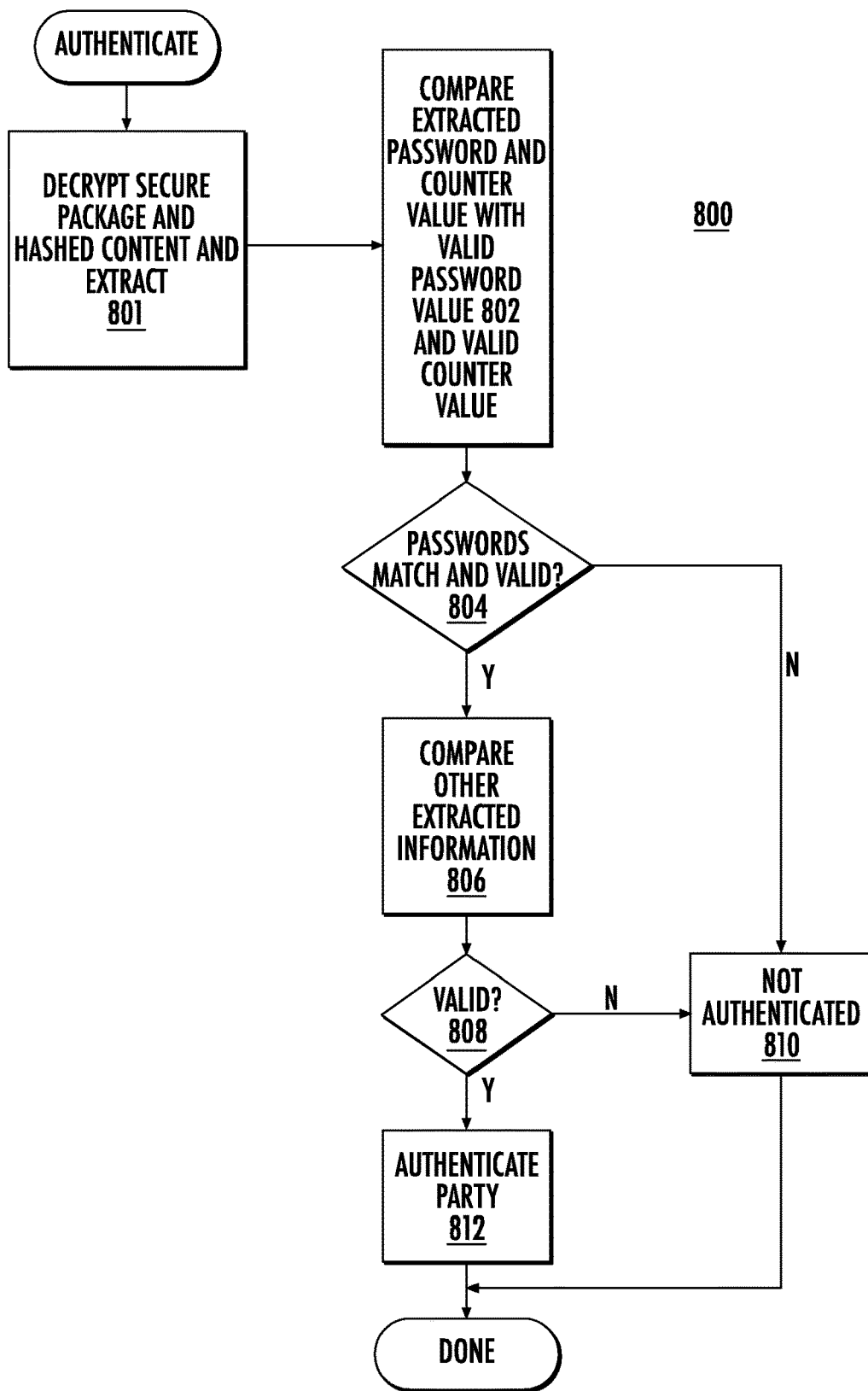
FIG. 8 depicts a flowchart illustrating steps that may be performed to authenticate an initiating party.

FIG. 8 depicts a flowchart 800 of steps performed to authenticate the initiating party once the authentication message with the secure package has been received by the server computing device as the recipient party. Initially, the server computing device uses the decryption keys to decrypt the secure package. In addition, the decryption keys are used to decrypt the hash to extract the inputs that were hashed together by the hash function (801). The extracted password and counter value may be compared with the valid password and valid counter value (802). A determination is made whether the passwords match and the counter values match or if the extracted counter value otherwise indicates that the password has not expired (804). If the passwords match and the extracted password has not expired based on the extracted counter value, other extracted information may be compared (806).

Figure 9:
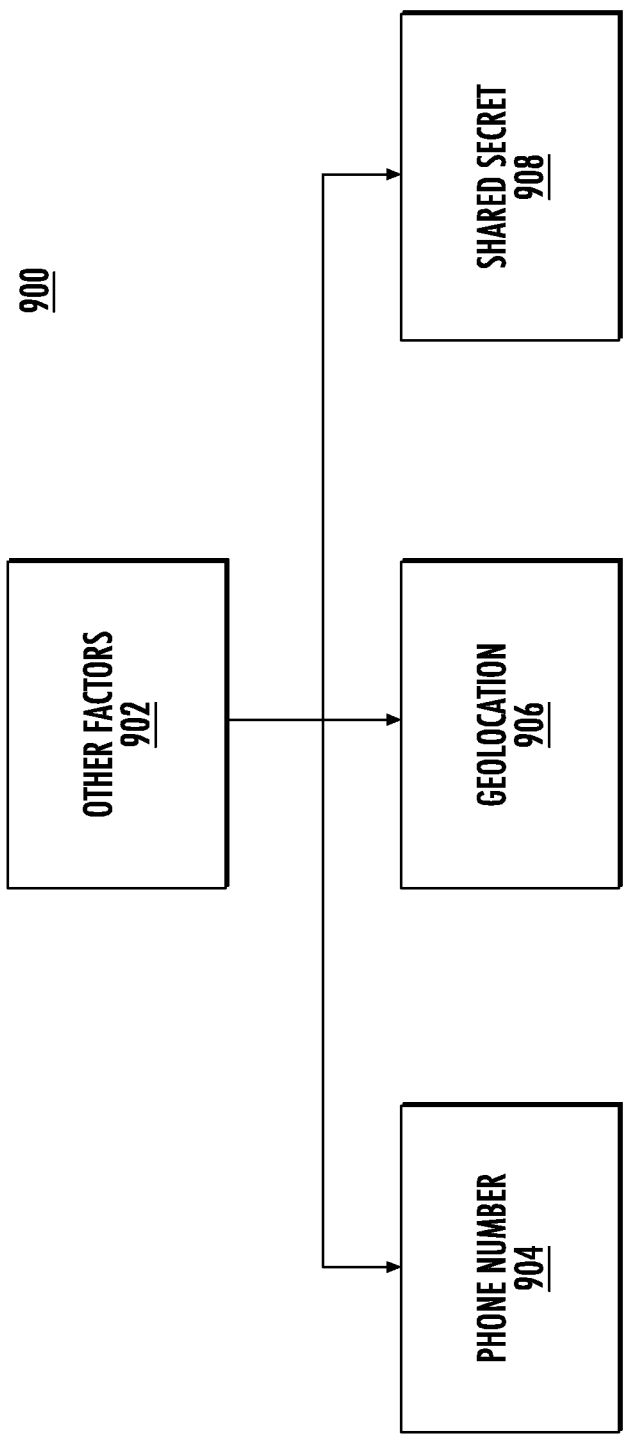
FIG. 9 depicts other types of authentication factors.

The other information may be other authentication factors 902, such as depicted in diagram 900 of FIG. 9. The other authentication factors 902 may include the phone number of the messaging-capable computing device, which may be compared to the phone number on record for the initiating party. The other authentication factors 902 may include a geolocation 906 for the initiating party. The geolocation 906 may be information such as GPS information or area code and exchange prefix information that may be compared with information regarding the residence of the party. The other authentication factors 902 may include a shared secret that is shared between an authenticated party and the server computing device.

If the other information is valid (808), then the initiating party may be authenticated (812). If not, the initiating party is not authenticated (810). Similarly, if the passwords do not match or the password has expired as indicated by the extracted counter value, the initiating party is not authenticated (810).

While the present invention has been described with reference to exemplary embodiments herein, it will be appreciated that various changes in scope and detail may be made without departing from the intended scope as defined in the appended claims.

The invention claimed is:

1. A method, comprising:
receiving, at a server, a message from a client device, wherein the message comprises a request to initiate a secure messaging session, and wherein the message includes a secure component generated by a contactless card based in part on a counter value generated by the contactless card;
decrypting the secure component to obtain a credential and a counter value;
determining if the credential and the counter value are valid based on a counter value maintained by the server, wherein the counter value maintained by the server is synchronized with the counter value generated by the contactless card;
where the credential and the counter value are valid, initiating the secure messaging session by sending a message to the client device; and
where the credential and the counter value are not valid, rejecting initiation of the secure messaging session with the client device.

2. The method of claim 1, wherein the secure component is further based on an account identifier.

3. The method of claim 1, wherein the secure messaging session comprises one of a Short Message Service (SMS) session, an instant messaging session, a social media messaging session, a video messaging session, a chatbot messaging session, or a virtual assistant messaging session.

4. The method of claim 1, wherein the credential is a one-time password.

5. The method of claim 1, further comprising:
receiving, by the server from the client device, geolocation information describing a location of the client device; and
determining, by the server, whether to initiate the secure messaging session or reject initiation of the secure messaging session based on the geolocation information.

6. The method of claim 1, wherein the secure messaging session is between the client device and a chatbot executing on the server.

7. The method of claim 1, wherein the synchronized counter values change each time data is exchanged between the contactless card and the client device, wherein the credential comprises a hash value.

8. A computing apparatus, comprising:
a processor; and
a memory storing instructions that, when executed by the processor, cause the processor to:
receive a message from a client device, wherein the message comprises a request to initiate a secure messaging session, and wherein the message includes a secure component generated by a contactless card based in part on a counter value generated by the contactless card;
decrypt the secure component to obtain a credential and a counter value;
determine if the credential and the counter value are valid based on a counter value maintained by the apparatus, wherein the counter value maintained by the apparatus is synchronized with the counter value generated by the contactless card;
where the credential and the counter value are valid, initiate the secure messaging session by sending a message to the client device; and
where the credential and the counter value are not valid, reject initiation of the secure messaging session with the client device.

9. The computing apparatus of claim 8, wherein the secure component is further based on an account identifier.

10. The computing apparatus of claim 8, wherein the secure messaging session comprises one of a Short Message Service (SMS) session, an instant messaging session, a social media messaging session, a video messaging session, a chatbot messaging session, or a virtual assistant messaging session.

11. The computing apparatus of claim 8, wherein the credential is a one-time password.

12. The computing apparatus of claim 8, wherein the instructions further cause the processor to:
receive, from the client device, geolocation information describing a location of the client device; and
determine whether to initiate the secure messaging session or reject initiation of the secure messaging session based on the geolocation information.

13. The computing apparatus of claim 8, wherein the secure messaging session is between the client device and a chatbot executing on the processor.

14. The computing apparatus of claim 8, wherein the synchronized counter values change each time data is exchanged between the contactless card and the client device, wherein the credential comprises a hash value.

15. A non-transitory computer-readable storage medium, the computer-readable storage medium including instructions that when executed by a processor of a server, cause the processor to:
receive a message from a client device, wherein the message comprises a request to initiate a secure messaging session, and wherein the message includes a secure component generated by a contactless card based in part on a counter value generated by the contactless card;
decrypt the secure component to obtain a credential and a counter value;
determine if the credential and the counter value are valid based on a counter value maintained by the server, wherein the counter value maintained by the server is synchronized with the counter value generated by the contactless card;
where the credential and the counter value are valid, initiate the secure messaging session by sending a message to the client device; and
where the credential and the counter value are not valid, reject initiation of the secure messaging session with the client device.

16. The computer-readable storage medium of claim 15, wherein the secure component is further based on an account identifier.

17. The computer-readable storage medium of claim 15, wherein the secure messaging session comprises one of a Short Message Service (SMS) session, an instant messaging session, a social media messaging session, a video messaging session, a chatbot messaging session, or a virtual assistant messaging session.

18. The computer-readable storage medium of claim 15, wherein the credential is a one-time password.

19. The computer-readable storage medium of claim 15, wherein the instructions further cause the processor to:
receive, from the client device, geolocation information describing a location of the client device; and
determine whether to initiate the secure messaging session or reject initiation of the secure messaging session based on the geolocation information.

20. The computer-readable storage medium of claim 15, wherein the secure messaging session is between the client device and a chatbot executing on the server.

* * * * *